May 1, 1934.    E. H. HORSTKOTTE    1,957,214
WELDING ELECTRODE
Filed Aug. 31, 1933
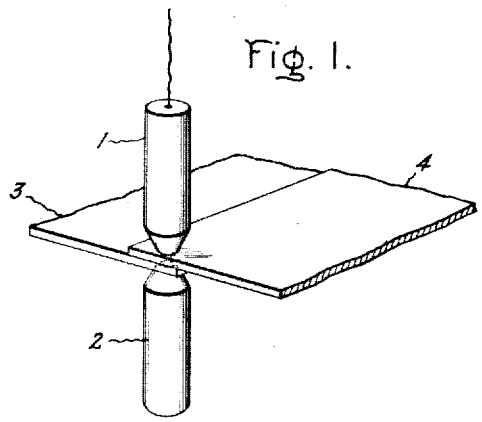
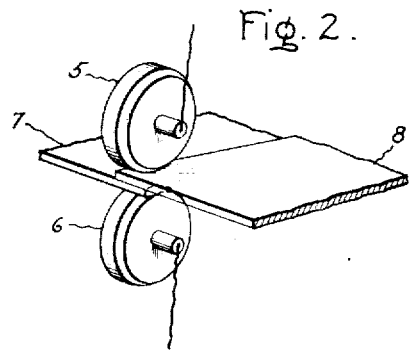
Inventor:
Edward H. Horstkotte,
by Harry E. Dunham
His Attorney Patented May 1, 1934

1,957,214

UNITED STATES PATENT OFFICE 1,957,214

WELDING ELECTRODE

Edward H. Horstkotte, Erie, Pa., assignor to General Electric Company, a corporation of New York Application August 31, 1933, Serial No. 687,591

3 Claims. (Cl. 219—4)

My invention relates to electrodes such as are used in resistance welding and heating operations.

Resistance welding is that form of welding in which the parts are united by the application of pressure after they have been heated to a welding temperature by the passage of electric current therethrough. There are many forms of resistance welding, the most common of which are butt welding, spot welding and line welding. Butt welding is further divided into pressure welding and flash welding. In pressure welding the parts are brought together under pressure after which current is caused to flow from one part to the other across the area of contact to raise the abutting end portions of the parts to a welding temperature, and the weld is then completed by the further application of pressure referred to as the upsetting pressure. In flash welding the abutting edge portions of the parts are heated to a welding temperature by establishing a sparking or arcing contact between them and the parts are united by pressure after this flashing operation has raised the edge portions of the parts to the desired welding temperature. Spot welding is that form of resistance welding in which a portion of the metals in contact with one another is welded by restricting the flow of current and pressure to that portion, whereas line welding or seam welding, as it is sometimes called, is that form of resistance welding in which the parts are welded together under pressure progressively along a continuous line of contact.

Resistance heating depends on the heating effect of a current of electricity when supplied through an object to be heated. It is closely related to welding. For example, the electric riveting process is substantially the same as spot welding in that the rivet is softened by current fed therethrough, and then headed by subjecting it to pressure.

The electric current employed in performing resistance welding and heating operations is supplied to the work parts through electrodes. It is desirable that these electrodes have a relatively low resistance and, for this reason, copper electrodes have long been used for this purpose. Copper, however, has a relatively low compressive strength and the surfaces of electrodes of this material soon become deformed with use requiring relatively frequent replacement or redressing. Copper alloy electrodes and electrodes of hard metal compositions have been proposed but have not been widely adopted, principally because of their cost but sometimes because of their slight superiority over electrodes of copper.

It is an object of my invention to provide an electrode of the class described which has a good electrical conductivity, which is relatively hard, and wear resistant, which will withstand relatively high pressure without deformation, which will withstand relatively hard blows without injury thereto, and which is relatively inexpensive.

For a better understanding of the nature and objects of my invention reference should be had to the following description taken in connection with the accompanying drawing, Fig. 1 of which diagrammatically represents resistance welding electrodes such as used in spot welding operations, and Fig. 2 of which diagrammatically represents resistance welding electrodes such as used in line welding operations.

Electrodes made in accordance with my invention comprise an alloy of copper, cobalt and beryllium. At present I prefer to use an alloy of about the following composition: 97 per cent copper; 2.6 per cent cobalt; and .4 per cent beryllium. An alloy of this composition when heated to 900° C. and then quenched in water and thereafter heated to from 500 to 600° C. for approximately one hour and allowed to cool has a conductivity between 36 and 44 per cent that of copper and a Brinell hardness of between 170 and 210 as compared with an average hardness of about 35 for cast copper and 95 for drawn copper. In the drawing operation there is no difference between air cooling and furnace cooling from 600° C. Consequently, air cooling is to be preferred because of the saving in time resulting therefrom. The temperature of the draw may vary with the amount of beryllium in the alloy.

The alloy of my electrode is readily machinable, is capable of being forged, and rolls readily at 850° C. It also rolls cold after annealing. Because of these qualities it may readily be formed into electrodes of any desired shape and size. The alloy also has a particularly desirable quality in that it will resist temperatures up to 500 to 600° C. without losing the qualities imparted thereto by the heat treatment above specified. By properly cooling the electrode these temperatures will not be exceeded in resistance welding and heating apparatus. For a more detailed description of this alloy reference may be had to U. S. Letters Patent No. 1,847,929, Otto Dahl, granted March 1, 1932.

The initial cost of my electrode is quite small and the cost of maintaining it in operating condition is likewise small. In spot welding with my engage the tripping lug 2 from beneath so that without dressing the electrode, whereas with another copper alloy electrode considered to have superior qualities the same operator could obtain only from 1000 to 2000 operations before it was necessary to reshape or resurface the electrode. My electrode is likewise superior for line welding operations. For example, with my electrode 60 to 70 pieces can be welded without replacing or redressing the wheel, whereas with another copper alloy electrode which is considered to have superior qualities only 25 to 30 pieces of the same character could be welded. It is because of the low first cost as well as the unusual wearing qualities of my electrode that it is particularly desirable for use in resistance welding operations.

In the drawing I have illustrated resistance welding electrodes such as are used in spot welding and line welding operations. In Fig. 1 spot welding electrodes 1 and 2 engage the opposite sides of sheets 3 and 4 which are lapped upon one another at the point where it is desired to unite them by a welding operation. The flow of welding current through the sheets 3 and 4 is restricted to the work engaging surface contacts of the electrodes 1 and 2 as is also the pressure applied to these sheets. In Fig. 2, line welding electrodes are illustrated at 5 and 6 as disks or wheels which engage the opposite sides of lapped sheets 7 and 8. Welding current and pressure are applied to these electrodes, which during the welding operation are traversed progressively along the plates to form a line weld between them. During the welding operation the welding current may be periodically interrupted in order to improve the welding operation.

In spot welding and line welding machines it is not customary to break the welding circuit at the welding electrode. A switch is ordinarily provided for controlling the flow of welding current and the circuit is interrupted at the switch before the electrodes are separated from the work. It is desirable to use this method of operation with my electrode since while the electrode will successfully withstand whatever sparking may take place while welding, the electrode will become roughened and parts of the electrode may adhere to the work if it is also used for circuit interrupting duty.

While the entire electrode of my invention may be made relatively cheaply of the alloy specified above, it is apparent that only the work engaging surface thereof need be made of the alloy. Generally however it will be more economical to make the entire electrode of the alloy, for the materials in it cost at present about 25 to 30 cents a pound and the hardening and drawing operations incident to its heat treatment are comparatively inexpensive.

While I prefer to use a copper, cobalt, beryllium alloy of substantially the above specified composition it is to be understood that other metals having the effective alloying characteristics of cobalt may be substituted for the cobalt without departing from my invention. It is also to be understood that only a slight amount of beryllium is to be used, at the most about 1 per cent as has been pointed out more at length in the above-identified patent to Otto Dahl.

What I claim as new and desire to secure by Letters Patent of the United States is:

1. A pressure exerting electrode of the class described having a hard wear resisting contact surface of an alloy of about 97 per cent copper, not more than one per cent beryllium, and the remainder of a metal having the effective alloying characteristics of cobalt.

2. A pressure exerting electrode of the class described having a hard wear resisting contact surface of an alloy of about 97 per cent copper, about 2.6 per cent cobalt, and about .4 per cent beryllium.

3. A pressure exerting electrode of the class described comprising an alloy of about 97 per cent copper, about 2.6 per cent cobalt, and about .4 per cent beryllium having a Brinell hardness of about 170 to 210 and a conductivity of about 36 to 44 per cent that of copper.

EDWARD H. HORSTKOTTE.

CERTIFICATE OF CORRECTION.

Patent No. 1,957,214.

May 1, 1934.

EDWARD H. HORSTKOTTE.

It is hereby certified that error appears in the printed specification of the above numbered patent requiring correction as follows: Page 2, line 1, strike out the words "engage the tripping lug 2, from beneath so that" and insert instead electrode one operator was able to weld 18,000 spots; and that the said Letters Patent should be read with this correction therein that the same may conform to the record of the case in the Patent Office.

Signed and sealed this 19th day of June, A. D. 1934.

Bryan M. Battey

Acting Commissioner of Patents.

(Seal)

engage the tripping lug 2 from beneath so that without dressing the electrode, whereas with another copper alloy electrode considered to have superior qualities the same operator could obtain only from 1000 to 2000 operations before it was necessary to reshape or resurface the electrode. My electrode is likewise superior for line welding operations. For example, with my electrode 60 to 70 pieces can be welded without replacing or redressing the wheel, whereas with another copper alloy electrode which is considered to have superior qualities only 25 to 30 pieces of the same character could be welded. It is because of the low first cost as well as the unusual wearing qualities of my electrode that it is particularly desirable for use in resistance welding operations.

In the drawing I have illustrated resistance welding electrodes such as are used in spot welding and line welding operations. In Fig. 1 spot welding electrodes 1 and 2 engage the opposite sides of sheets 3 and 4 which are lapped upon one another at the point where it is desired to unite them by a welding operation. The flow of welding current through the sheets 3 and 4 is restricted to the work engaging surface contacts of the electrodes 1 and 2 as is also the pressure applied to these sheets. In Fig. 2, line welding electrodes are illustrated at 5 and 6 as disks or wheels which engage the opposite sides of lapped sheets 7 and 8. Welding current and pressure are applied to these electrodes, which during the welding operation are traversed progressively along the plates to form a line weld between them. During the welding operation the welding current may be periodically interrupted in order to improve the welding operation.

In spot welding and line welding machines it is not customary to break the welding circuit at the welding electrode. A switch is ordinarily provided for controlling the flow of welding current and the circuit is interrupted at the switch before the electrodes are separated from the work. It is desirable to use this method of operation with my electrode since while the electrode will successfully withstand whatever sparking may take place while welding, the electrode will become roughened and parts of the electrode may adhere to the work if it is also used for circuit interrupting duty.

While the entire electrode of my invention may be made relatively cheaply of the alloy specified above, it is apparent that only the work engaging surface thereof need be made of the alloy. Generally however it will be more economical to make the entire electrode of the alloy, for the materials in it cost at present about 25 to 30 cents a pound and the hardening and drawing operations incident to its heat treatment are comparatively inexpensive.

While I prefer to use a copper, cobalt, beryllium alloy of substantially the above specified composition it is to be understood that other metals having the effective alloying characteristics of cobalt may be substituted for the cobalt without departing from my invention. It is also to be understood that only a slight amount of beryllium is to be used, at the most about 1 per cent as has been pointed out more at length in the above-identified patent to Otto Dahl.

What I claim as new and desire to secure by Letters Patent of the United States is:

1. A pressure exerting electrode of the class described having a hard wear resisting contact surface of an alloy of about 97 per cent copper, not more than one per cent beryllium, and the remainder of a metal having the effective alloying characteristics of cobalt.

2. A pressure exerting electrode of the class described having a hard wear resisting contact surface of an alloy of about 97 per cent copper, about 2.6 per cent cobalt, and about .4 per cent beryllium.

3. A pressure exerting electrode of the class described comprising an alloy of about 97 per cent copper, about 2.6 per cent cobalt, and about .4 per cent beryllium having a Brinell hardness of about 170 to 210 and a conductivity of about 36 to 44 per cent that of copper.

EDWARD H. HORSTKOTTE.

CERTIFICATE OF CORRECTION.

Patent No. 1,957,214.                                                             May 1, 1934.

EDWARD H. HORSTKOTTE.

It is hereby certified that error appears in the printed specification of the above numbered patent requiring correction as follows: Page 2, line 1, strike out the words "engage the tripping lug 2, from beneath so that" and insert instead electrode one operator was able to weld 18,000 spots; and that the said Letters Patent should be read with this correction therein that the same may conform to the record of the case in the Patent Office.

Signed and sealed this 19th day of June, A. D. 1934.

Bryan M. Battey

Acting Commissioner of Patents.

(Seal)